(12) United States Patent
Sanders et al.

(10) Patent No.: US 9,004,304 B2
(45) Date of Patent: Apr. 14, 2015

(54) DEVICE FOR AT LEAST PARTIALLY BLOCKING AN OPENING AND FORMING A SEAL IN THE OPENING

(71) Applicants: Scott Allen Sanders, Arnold, MO (US); David Mark Allen, St. Louis, MO (US)

(72) Inventors: Scott Allen Sanders, Arnold, MO (US); David Mark Allen, St. Louis, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 94 days.

(21) Appl. No.: 13/942,779

(22) Filed: Jul. 16, 2013

(65) Prior Publication Data
US 2015/0020921 A1 Jan. 22, 2015

(51) Int. Cl.
| | | |
|---|---|---|
| *F01P 11/02* | (2006.01) | |
| *F16J 15/06* | (2006.01) | |
| *B65D 39/12* | (2006.01) | |
| *F16L 37/02* | (2006.01) | |
| *F16L 31/00* | (2006.01) | |
| *F16L 55/11* | (2006.01) | |

(52) U.S. Cl.
CPC .......... *F01P 11/0276* (2013.01); *F01P 11/0204* (2013.01); *F16L 37/02* (2013.01); *F16L 31/00* (2013.01); *F16L 55/11* (2013.01); *B65D 39/12* (2013.01); *F16J 15/06* (2013.01)

(58) Field of Classification Search
CPC ........... B65D 39/12; F16J 13/02; F16J 15/06; F16J 15/02; F16J 15/46
USPC .............. 220/235, 234, 233, 238, 212, 254.8, 220/254.9, 254.1, 378; 215/228, 360, 361, 215/358, 356, 355, 364; 277/639, 637, 633, 277/628, 593
See application file for complete search history.

(56) References Cited

U.S. PATENT DOCUMENTS

| | | | | |
|---|---|---|---|---|
| 302,881 | A  * | 7/1884 | Kempson | 215/356 |
| 491,184 | A  * | 2/1893 | McCartney | 138/89 |
| 3,139,103 | A  * | 6/1964 | Bottum | 137/72 |
| 6,152,193 | A | 11/2000 | Klamm | |
| 6,234,215 | B1 | 5/2001 | Klamm | |
| 6,360,790 | B1 | 3/2002 | Klamm | |

OTHER PUBLICATIONS

Air Lift—Automotive Topics, http://www.crookedriverwriter.com/index.php?/Automotive-Topics/air-lift.htm retrieved Jul. 15, 2013.

* cited by examiner

*Primary Examiner* — Robert J Hicks
(74) *Attorney, Agent, or Firm* — J-Tek Law PLLC; Jeffrey D. Tekanic; Scott T. Wakeman

(57) ABSTRACT

A device includes a first body having a curved wall with a top surface that slopes away from the first body and a second body having an interior configured to receive the curved wall of the first body, the interior including a curved ramp with a sloped bottom ramp surface. The second body is mounted on the first body with the bottom surface of the curved ramp resting on the top surface of the curved wall. A compressible seal extends from the first body bottom, and a shaft projects from the second body through a passage in the first body and into the interior of the compressible seal. Rotating the bodies relative to each other causes the shaft to pull the seal against the first body and radially expand the seal against an interior wall of an opening in which the device is placed to form a seal therewith.

20 Claims, 6 Drawing Sheets

DEVICE FOR AT LEAST PARTIALLY BLOCKING AN OPENING AND FORMING A SEAL IN THE OPENING

FIELD OF THE INVENTION

The present invention is directed to a device for at least partially blocking an opening and for forming a seal inside the opening, and, more specifically, toward an adapter having first and second mutually rotatable parts, a compressible seal and a shaft that extends into the compressible seal, which rotatable parts are configured to selectively compress the compressible seal toward the first and second parts to radially expand the compressible seal against an interior wall of an opening to form a seal.

BACKGROUND OF THE INVENTION

It is often desirable to form a seal with an inside wall of an opening or a tube. This may be done to completely block or plug the opening or tube or to connect an adapter or similar structure to the opening or tube. For example, one method of filling a vehicle radiator requires establishing a partial vacuum in the radiator. This is done by inserting an adapter into the radiator filler neck, forming a seal between the adapter and the inside wall of the filler neck and using a pump to remove air from the radiator through the adapter. An opening in the adapter is then connected to a source of clean radiator fluid, and the pressure difference between the inside of the radiator and ambient pressure forces the clean radiator fluid into the radiator.

Conventional adapters for filling vehicle radiators generally include a flexible seal member that is insertable into the radiator filler neck, a shaft that extends through the flexible seal member, and two bodies at one end of the seal member that are connected to one another by screwthreads. The shaft is connected to one of the bodies, extends through the other body and the seal member and is connected to the seal member. Starting with the two bodies screwed together, the flexible seal member is inserted into the filler neck, and the bodies are then screwed apart from one another. This moves the top of one body away from the bottom of the other body, pulls the distal end of the shaft toward the bodies and compresses the seal member. Such compression of the seal member causes the side wall of the seal member to bulge and press against the inside wall of the tube. As the bodies are unscrewed further, the connection between the sidewall and the seal member becomes tighter, and a fluid-tight seal with the tube sidewall is formed.

This arrangement works adequately for its intended purpose. However, in order to expand the seal member sufficiently to form a tight seal with the inside wall of the filler neck, it is generally necessary to turn the one body multiple times in one direction with respect to the other body to form the seal and then to turn the one body multiple times in the other direction to reverse this process. It would be desirable to provide a device that forms a seal with the inside of an opening or tube in a manner that does not require this screwing operation and that can be sealed to and unsealed from the interior of an opening or a tube in a simple manner.

SUMMARY OF THE INVENTION

These problems and others are addressed by embodiments of the present invention, a first aspect of which comprises an adapter that includes a first body having a bottom and a second body having a top. The second body is rotatably mounted to the first body, and the first body and the second body are movable between a first angular relationship and a second angular relationship. A first one of the first body and the second body has a first ramp with a first ramp surface, and the other one of the first body and the second body has a ramp follower in contact with the first ramp surface. The first body bottom is separated from the second body top by a first distance when the first body and second body are in the first angular relationship and by a second distance greater than the first distance when the first body and the second body are in the second angular relationship. The ramp follower moves from a first location on the first ramp surface to a second location on the first ramp surface in response to the first body and the second body moving from the first angular relationship to the second angular relationship. A compressible seal extends from the first body and has a first end at the first body, a second end spaced from the first body, an interior, and an outer wall. The outer wall is configured to form a fluid-tight seal with an interior of an opening in which the adapter is placed. A shaft projects from the second body through an opening in the first body and into the interior of the compressible seal, and the shaft is configured to move relative to the first body when the first body and the second body move from the first angular relationship to the second angular relationship. The shaft is also configured to move the second end of the compressible seal toward the first body and to radially expand the compressible seal against the interior of the opening when the first body and the second body move from the first angular relationship to the second angular relationship.

A further aspect of the invention comprises a device for at least partially blocking an opening. The device includes a first body having a bottom and a second body having a top that is rotatably mounted to the first body. The first body and the second body are movable between a first angular relationship and a second angular relationship. A first one of the first body and the second body has a first ramp with a ramp surface, and a second one of the first body and the second body has a ramp follower that is in contact with the first ramp surface. The first body bottom is separated from the second body top by a first distance when the first body and the second body are in the first angular relationship and by a second distance greater than the first distance when the first body and the second body are in the second angular relationship. The ramp follower moves from a first location on the first ramp surface to a second location on the first ramp surface in response to the first body and the second body moving from the first angular relationship to the second angular relationship. A compressible seal extends from the first body and has a first end at the first body and a second end spaced from the first body and an interior. A shaft projects from the second body through an opening in the first body and into the interior of the compressible seal, and the shaft is configured to move relative to the first body when the first body and the second body move from the first angular relationship to the second angular relationship. The shaft is configured to move the second end of the compressible seal toward the first body and compress the compressible seal when the first body and the second body move from the first angular relationship to the second angular relationship.

Another aspect of the invention comprises a device for at least partially blocking an opening that includes a first body having a bottom, a top and a curved wall projecting from the top. The curved wall has a first end and a second end, and at least one curved sidewall, and follows a periphery of the first body. The curved wall also has a wall top surface spaced from the top by a first distance which distance increases from the first end of the curved wall to the second end of the curved wall. The device also includes a second body having an open bottom, a top and an interior configured to receive the curved wall of the first body. The interior of the second body includes a curved ramp having a first end and a second end and a bottom surface, and the bottom surface is spaced from the second body top by a second distance which distance increases from the first end of the second ramp to the second end of the second ramp. The second body is mounted on the first body with the bottom surface of the curved ramp resting on the top surface of the curved wall. A compressible seal extends from the first body bottom and has a first end at the first body and a second end spaced from the first body and an interior. A shaft projects from the second body through an opening in the first body and into the interior of the compressible seal.

A further aspect of the invention comprises a device for at least partially blocking an opening which device includes a first body having a bottom and a second body having a top that is mounted to the first body such that the first body and the second body are mutually rotatable between a first angular relationship and a second angular relationship. The first body bottom is separated from the second body top by a first distance when the first body and second body are in the first angular relationship and by a second distance greater than the first distance when the first body and the second body are in the second angular relationship. The device includes a compressible seal extending from the second body that has a first end at the second body and a second end spaced from the second body and an interior. A shaft projects from the first body through an opening in the second body and into the interior, and the shaft is configured to move relative to the second body when the first body and the second body move from the first angular relationship to the second angular relationship and is configured to move the second end of the compressible seal toward the second body and compress the compressible seal when the first body and the second body move from the first angular relationship to the second angular relationship. The device also includes means for moving the second body top away from the first body bottom in response to the rotation of the first body and the second body from the first angular relationship to the second angular relationship.

BRIEF DESCRIPTION OF THE DRAWINGS

These and other aspects and features of the present invention will be better understood after a reading of the following detailed description together with the attached drawings, wherein.

DETAILED DESCRIPTION

Figure 1:
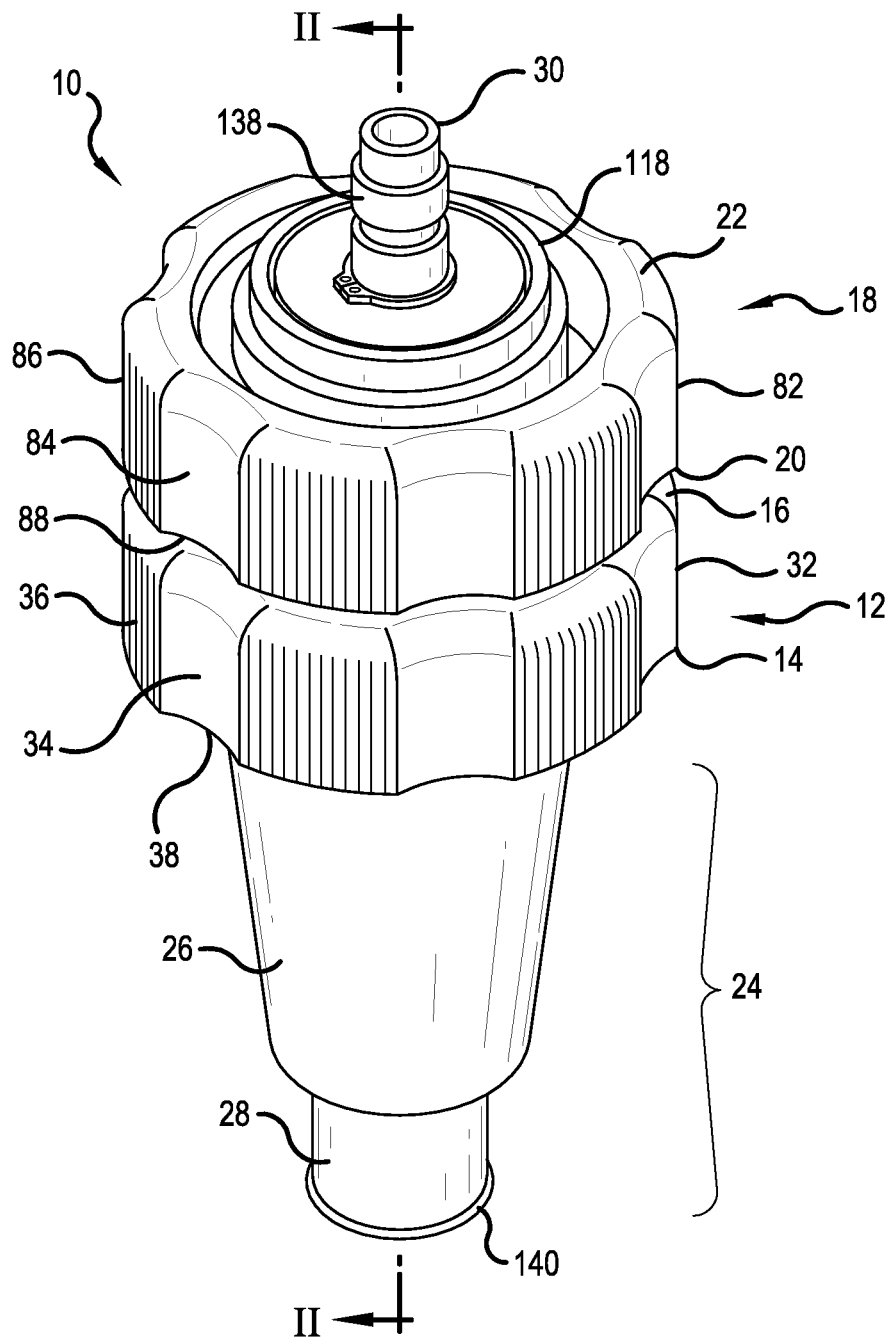
FIG. 1 is a perspective view of an adapter according to an embodiment of the present invention that includes two mutually rotatable bodies and a seal that has a cone-shaped portion and a cylindrical portion.

Referring now to the drawings, wherein the showings are for purposes of illustrating presently preferred embodiments of the invention only and not for the purpose of limiting same, FIG. 1 illustrates an adapter 10 that includes a first body 12 having a bottom 14 and a top 16, a second body 18 mounted on the first body 12 and having a bottom 20 and a top 22, and a seal 24 depending from the bottom 14 of the first body 12. The seal 24 includes a first portion 26 that is tapered and shaped like a truncated cone and a second portion 28 that is generally cylindrical. A hollow shaft 30 extends through the second body 18, the first body 12 and the seal 24.

Figure 7:
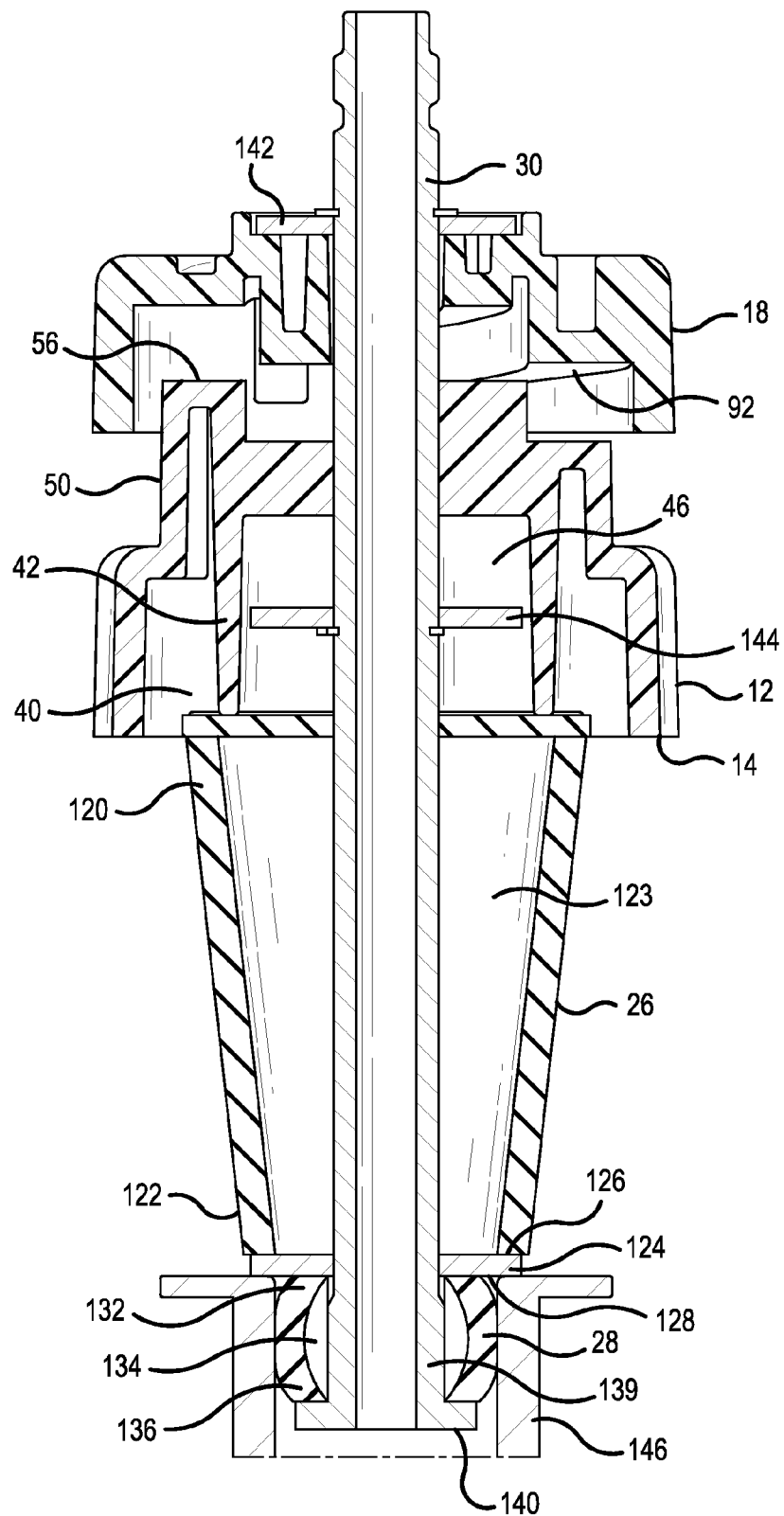
FIG. 7 is a sectional side elevational view of the adapter of FIG. 1 with the cylindrical portion of the seal inserted into a small tube and forming a seal with the interior of the small tube.
Figure 8:
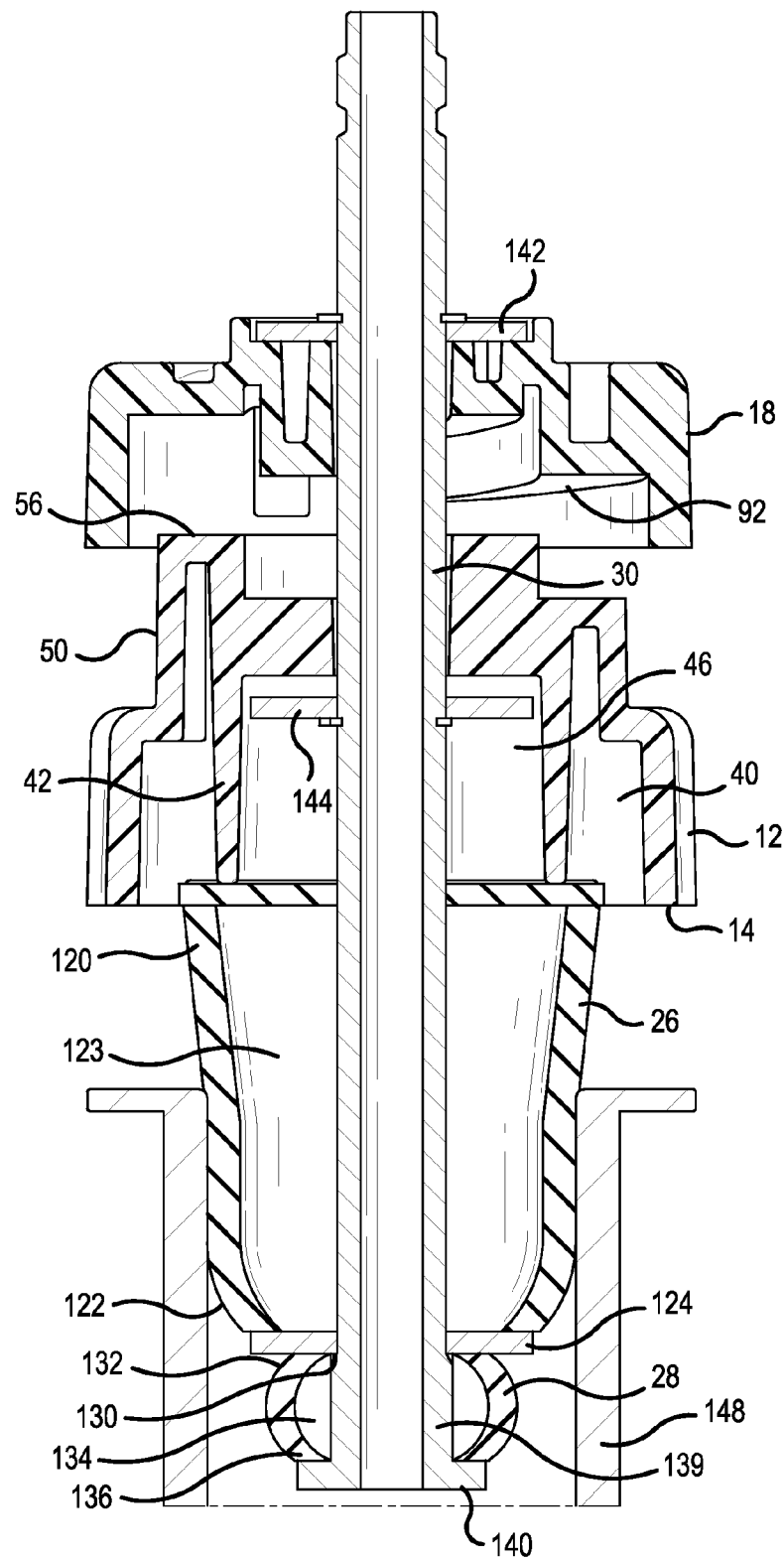
FIG. 8 is a sectional side elevational view of the adapter of FIG. 1 with the tapered or cone-shaped portion of the seal inserted into a large tube and forming a seal with the interior of the large tube.

This embodiment comprises an adapter 10 that allows a connection to be made between a hose (not illustrated) external to the adapter 10 and a filler neck, such as one of the filler necks 146, 148 of FIGS. 7 and 8, through the hollow shaft 30. A substantially similar device could be used as a stop or a plug for a tube if the shaft 30 were blocked or if a non-hollow shaft were used in place of the hollow shaft 30. The present embodiment is directed primarily to an adapter 10, but a device for forming a seal with an interior wall of an opening or a tube that does not include a hollow shaft and that does not adapt one element to another but instead serves solely as a closure or plug is also within the scope of the present invention. Moreover, while the disclosed embodiment is intended for use in a tubular filler neck of a radiator, it could also be used as a plug and/or an adapter in a passageway or opening in another structure, whether or not that structure comprises a tube.

The elements of the embodiments of the present invention many be described in terms of their orientation in the figures. An element that is located above another element in the figures, may, for example, be referred to a "top" or "upper" element while an element located below that element in the figures may be referred to as a "bottom" or "lower" element. It should be understood, however, that the device described herein can be used in any orientation, and in some orientations the element referred to as a "top" element may actually be located below a "bottom" element. This is done for convenience of explanation and is not intended to limit the disclosed device to use in any particular orientation.

Figure 2:
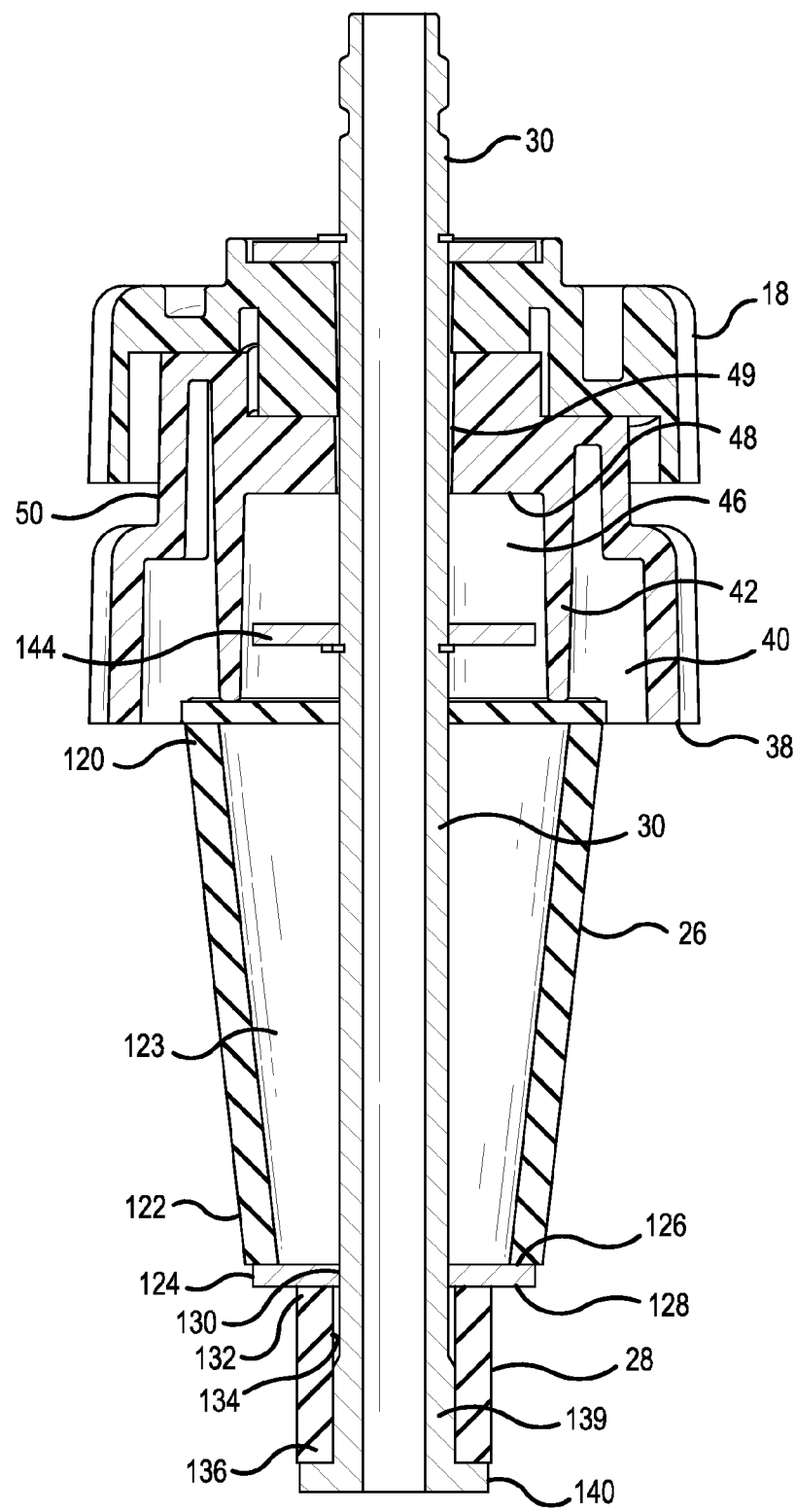
FIG. 2 is a sectional side elevational view taken along line II-II of FIG. 1.

The first body 12 includes a generally cylindrical outer wall 32 having indentations 34 and textured portions 36 that allow it to be securely grasped or turned by a user. The outer wall 32 at the bottom 14 of the first body 12 has a bottom edge 38 that defines a periphery of the first body 12 and a bottom entry into the interior 40 of the first body 12. As illustrated in FIG. 2, the interior 40 includes a depending wall 42 depending from an upper portion of the first body 12 and connected to the outer wall 32 by a plurality of ribs 44, illustrated in FIG. 4, the depending wall 44 defining a central chamber 46 having a top 48 in the first body 12. A passage 49 extends through the top 48. Each of the ribs 44 includes a cutout 45 adjacent the depending wall 42 for receiving the seal 24 as described below.

Figure 3:
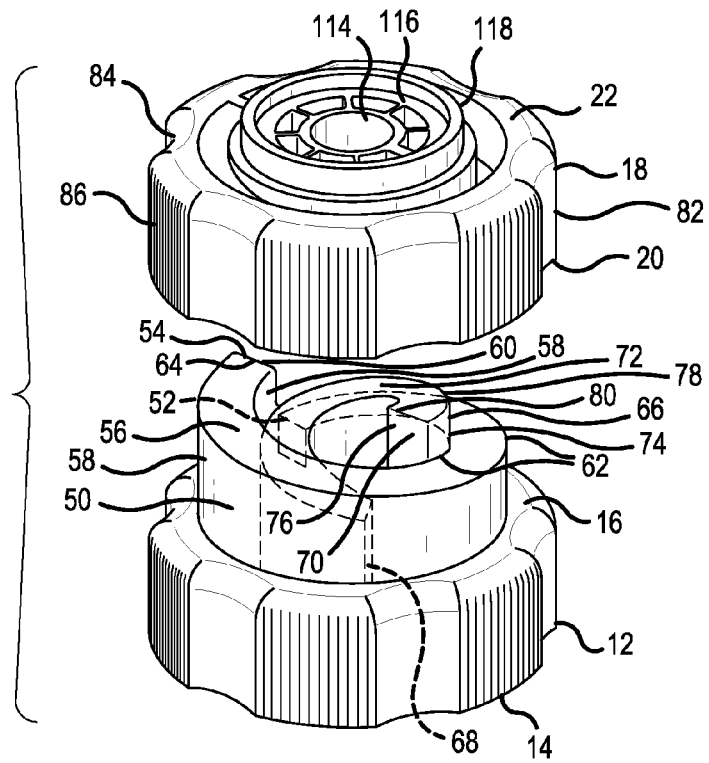
FIG. 3 is a first exploded perspective view of the two mutually rotatable bodies of FIG. 1.
Figure 4:
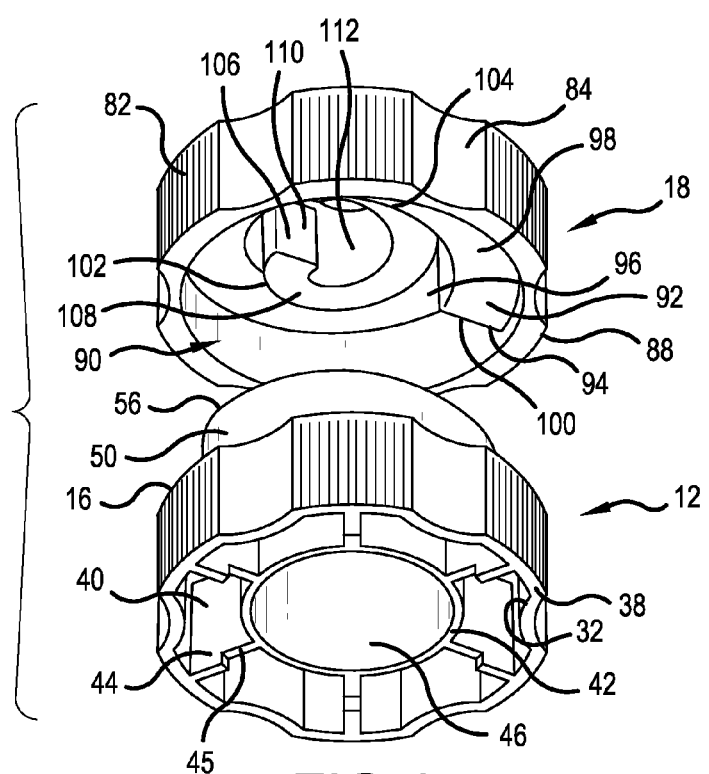
FIG. 4 is a second exploded perspective view of the mutually rotatable bodies of FIG. 1.

Referring now to FIGS. 3 and 4, a first curved wall 50 extends from the top 16 of the first body 12 and includes a first end 52, a second end 54, a top surface or ramp surface 56, first and second spaced, curved, sidewalls 58 and an end wall 60. The ramp surface 56 has first and second helical side edges 62 and an end edge 64 separating the top surface 56 from the end wall 60. A second curved wall 66 extends from the top 16 of the first body 12 inside the first curved wall 50 and includes a first end 68 a second end 70 a top or ramp surface 72, first and second spaced, curved sidewalls 74 and an end wall 76. The ramp surface 72 of the second curved wall 66 has first and second helical side edges 78 and an end edge 80 separating the top surface 72 of the second curved wall 66 from the end wall 76 of the second curved wall 66.

The second body 18 includes a generally cylindrical outer wall 82 having indentations 84 and textured portions 86 similar to those of the first body 12 that allow the second body 18 to be securely grasped or turned. The bottom 20 of the second body 18 includes a peripheral edge 88 that defines an opening into an interior 90 of the second body 18. The interior 90 of the second body 18 includes a first ramp 92 having a first end 94, a second end 96, a bottom surface or ramp surface 98 and an end wall 100. The interior 90 of the second body 18 also includes a second ramp 102 having a first end 104, a second end 106, a bottom or ramp surface 108 and an end wall 110. The first and second ramps 92, 102 surround a central passage 112 in the second body 18 and a bore 114 in the top 22 of the second body 18. The top 22 of the second body includes a flat central portion 116 surrounding the bore 114 which flat central portion 116 is surrounded by a low wall 118.

With reference to FIG. 2, the first portion 26 of the seal 24 is a hollow, truncated cone that has a large end 120, a small end 122 and a hollow interior 123. (The first portion 26 could, alternately, have a stepped configuration and "taper" in steps rather than continuously.) The large end 120 is mounted at the bottom 14 of the first body 12 around the opening into the central chamber 46 of the first body 12 and in the cutouts 45 of the ribs 44. The cutouts 45 in the ribs 44 limit lateral movement of the first portion 26 of the seal 24 even when the seal 24 is compressed as described below. A spacer 124 is mounted at the small end 122 of the seal first portion 26, which spacer 124 may comprise a washer, formed of metal or another material. The spacer 124 includes a first face 126 abutting the small end 122 of the seal first portion 26, a second face 128 opposite the first face, an outer diameter approximately the same as the outer diameter of the small end 122 of the seal first portion 26 and a central opening 130 having a diameter. The second portion 28 of the seal 24 is cylindrical and has a first end 132 abutting the second face 128 of the spacer 124, a hollow interior 134 and a second end 136 spaced from the spacer 124. Alternately, the second portion 28 of the seal 24 could be tapered.

The seal 24 is held against the bottom 14 of the first body 12 by the hollow shaft 30 that extends through the first and second bodies 12, 18, and through the first and second seal members 26, 28 and the spacer 124. The hollow shaft 30 has a first end portion 138 (FIG. 1) that projects away from the flat central portion 116 of the second body top 22. From the second body 18, the hollow shaft 30 extends through the bore 114 in the second body top 22, and through the central passage 112 inside the first ramp 92 and the second ramp 102. The hollow shaft 30 is secured to the bore 114 in a suitable manner, such as by adhesive (not shown) and/or a suitable interlocking fit (not shown), and/or in the manner described below, against rotation relative to the second body 18 so that the hollow shaft 30 rotates with the rotation of the second body 18. From the second body 18, the hollow shaft 30 extends through the passage 49 in the top 16 of the first body 12, through the central chamber 46 and past the bottom 14 of the first body 12, and through the interior 123 of the seal first portion 26, through the central opening 130 of the spacer 124 and through the hollow interior 134 of the seal second portion 28. The hollow shaft 30 has a second end 139 that is terminated with a flange 140, which flange 140 abuts the second end 136 of the seal second portion 28. The second end 139 of the hollow shaft 30, located between the flange 140 and the spacer 124, has a diameter greater than the width of the central opening 130 in the spacer 124 for reasons discussed below.

Figure 5:
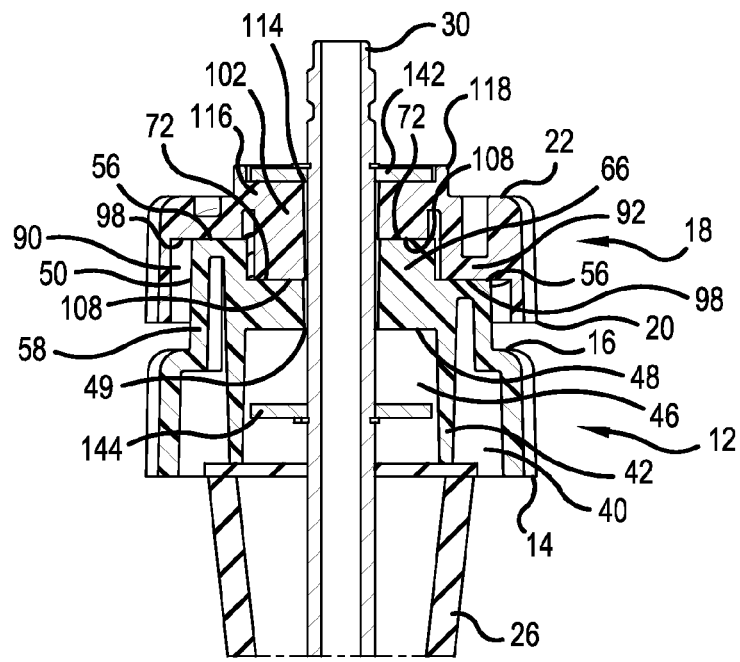
FIG. 5 is a sectional side elevational view of a portion of the adapter of FIG. 1 showing a first configuration of the adapter.
Figure 6:
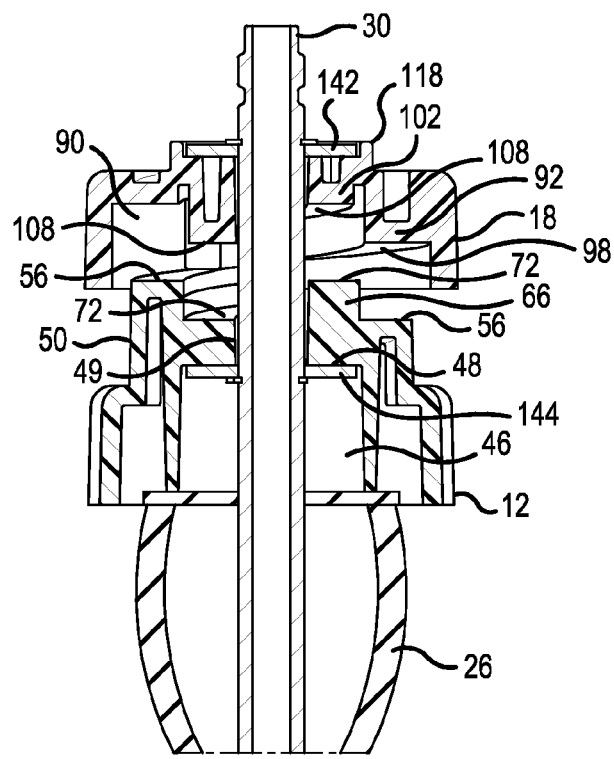
FIG. 6 is sectional side elevational view of a portion of the adapter of FIG. 1 showing a second configuration of the adapter.

As illustrated in FIGS. 5 and 6, the hollow shaft 30 also has a first disk 142 projecting perpendicularly therefrom and securely fastened thereto and mounted on the flat central portion 116 of the top 22 of the second body 18 in the space defined by the low wall 118. A secure connection between the first disk 142 and the top 22 of the second body 18 secures the hollow shaft 30 to the second body 18 and allows the hollow shaft 30 to rotate with the second body 18. The relatively large surface area of the first disk 142 provides a larger area for forming a bond with the second body 18 than the area at which the hollow shaft 30 contacts the interior of the bore 114 in the top 22 of the second body 18. Of course, the hollow shaft 30 can also be secured to the bore 114 by additional adhesive or with a mechanical interlocking arrangement as mentioned above. The hollow shaft 30 has a second disk 144 projecting perpendicularly therefrom at a location on the shaft that is inside the central chamber 46 of the first body 12. The second disk 144 limits the upward movement of the hollow shaft 30 relative to the first body 12 because the second disk 144 cannot move past the top 48 of the central chamber 46 when the hollow shaft 30 slides through the passage 49.

The adapter 10 has a storage or nonuse configuration, illustrated in FIG. 5, in which the second body 18 is mounted on the first body 12 so that the bottom surface 98 of the second body first ramp 92 rests on the top surface 56 of the first curved wall 50 and so that the bottom surface 108 of the second ramp 102 rests on the top surface 72 of the second curved wall 66 with the spaced curved sidewalls 58 of the first curved wall 50 projecting at least partially into the interior 90 of the second body 18. In this configuration, the end wall 100 of the second body first ramp 92 abuts the end wall 60 of the first curved wall 50 of the first body 12, and the end wall 110 of the second ramp 102 abuts the end wall 76 of the second curved wall 66 of the first body 12, and these abutting end walls limit relative rotation between the first body 12 and the second body 18 in a first direction. In this configuration, the second disk 144 is located in the central chamber 46 of the first body 12 at a distance from the top 48 of the central chamber 46, and the flange 140 of the hollow shaft 30 holds the seal first portion 26 and the seal second portion 28 securely against the bottom 14 of the first body 12. The length of the hollow shaft 30 is selected such that in this configuration, the seal 24 is maintained under sufficient compression to hold the seal first portion 26 and seal second portion 28 in place, but without substantially deforming either of the first and second seal portions 26, 28.

Rotating the second body 18 relative to the first body 12 moves the end wall 100 of the second body first ramp 92 away from the end wall 60 of the first curved wall 50 of the first body 12 and causes the bottom surface 98 of the first ramp 92 to slide over the top surface 56 of the first curved wall 50 and the bottom surface 108 of the second ramp 102 to slide over the top surface 72 of the second curved wall 66 of the first body 12. Because the first curved wall 50 becomes taller between its first end 52 and second end 54, the helical top surface 56 becomes increasingly distant from the top 16 of the first body between the first end 52 and the second end 54. Preferably, the height of the first wall, namely, the distance between the top surface 56 and the top 16 of the first body 12 increases at a substantially constant rate from the first end 52 of the first curved wall 50 to the second end 54 of the first curved wall 50. Similarly, the second curved wall 66 becomes taller between its first end 68 and its second end 70. The distance between the bottom surface 98 of the first ramp 92 and the top 22 of the second body 18 also increases between the first end 94 and second end 96 of the first ramp, and the distance between the bottom surface 108 of the second ramp 102 and the top 22 of the second body 18 also increases between the first end 104 and the second end 106 of the second ramp 102. The relative sliding of these oppositely facing helical surfaces (top surfaces 56 and 72 of the first body 12 and bottom surfaces 98 and 108 of the second body 18) cause the first body 12 and the second body 18 to move away from each other, specifically, causes the top 22 of the second body 12 to move away from the bottom 14 of the first body 12.

The foregoing description is of, essentially, ramps on the first body, formed by the tops 58, 72 of the first and second curved walls 50, 66 and ramps on the second body 18, namely the first and second ramps 92, 102. However, it is only necessary that a ramp be formed on one of the first and second bodies 12, 18. The other body can be provided with a structure that may be described as a "ramp follower" or a structure that slides along the ramp of the other body as the first and second bodies rotate. This is because the surfaces of the ramps are only in substantially full contact in the non-use configuration. After relative rotation between the first body 12 and second body 18 begins, it is merely necessary to have a structure on the second body 18 slide along the ramp or ramps on the first body 12 or a structure on the first body 12 slide along the ramp or ramps on the second body 18. However, for ease of assembly and manufacture, and to provide stability when assembled in the non-use configuration, ramps on both the first body 12 and the second body 18 are disclosed in this embodiment. In other words, in this embodiment, the ramp follower takes the form of a ramp.

The first body 12 and the second body 18 are rotatable relative to one another from a first angular relationship, illustrated in FIG. 4, to a second angular relationship illustrated in FIG. 5, and this rotation causes the top 22 of the second body 18 to move away from the bottom 14 of the first body 12. This movement, in turn, pulls the flange 140 at the second end 139 of the hollow shaft 30 toward the bottom 14 of the first body 12 and compresses the seal 24. The compression of the seal 24 occurs in two stages, discussed below in connection with FIGS. 7 and 8.

In the present embodiment, the first and second angular relationships are separated by about one full turn or by 360°. As used herein, 0° and 360° are two different angular relationships; that is, turning one of the first body 12 and the second body 18 relative to the other body by 360° constitutes moving the bodies from a first to a second angular relationship. This use of ramps allows the first body 12 to be axially separated from the second body 18 by a distance useful for forming a seal while undergoing only approximately a single turn (about a 360° relative change in angular position). This is not possible using a screwthread having a single turn because the maximum helix angle of screwthreads allows only a small separation to be obtained with a single rotation, and thus conventional devices that use screwthreads must be turned multiple times to achieve a useful separation between two bodies.

FIG. 7 illustrates the seal second portion 28 inserted in a relatively narrow filler neck 146 of a radiator (not illustrated) with the spacer 124 resting on an end of the filler neck 146. In FIG. 7, the first body 12 and second body 18 have been rotated away from the storage configuration of FIG. 4 a sufficient angular distance to pull the flange 140 toward the spacer 124 and compress the second end 136 of the seal second portion 28 toward the first end 132 of the seal second portion 28 to deform the seal second portion 28. This presses the outer wall of the seal second portion 28 tightly against the inside wall of the filler neck 146 and forms a seal with the filler neck 146. The outer wall of the seal second portion 28 is pressed against the inside wall of the filler neck 146 with sufficient force that no fluid can pass between the seal second portion 28 and the inside of the filler neck 146. The hollow shaft 30 can be selectively blocked, for example with a suitable cap (not illustrated). Thus, in this configuration, fluid cannot pass around the outside of the adapter 10 and can only pass through the hollow shaft 30 when the hollow shaft 30 is open.

Friction between the ramp surfaces (the top surface 56 of the first curved wall 50 against the bottom surface 98 of the first ramp 92 and the top surface 72 of the second curved wall 66 and the bottom surface 108 of the second ramp 102) and the relative angles of these ramp surfaces causes the first body 12 and second body 18 to maintain a relative orientation after being rotated to this first sealing position without sliding back toward their starting relationship.

FIG. 8 illustrates the adapter 10 inserted into a filler neck 148 that is larger than the diameter of the seal second portion 28. In this case, the tapered or conical seal first portion 26 is inserted into the filler neck 148 until an outer wall of the seal first portion 26 comes into contact with the opening of the filler neck 148. The first body 12 is held in place relative to the filler neck 148, and the second body 18 is rotated relative to the first body 12 to draw the second end 139 of the shaft 30 toward the bottom 14 of the first body 12. As mentioned above, the second end portion 139 of the hollow shaft 30 has a diameter larger than the width of the central opening 130 in the spacer 124. The seal second portion 28 of the seal 24 is also more readily deformed than the first portion 26 of the seal. Therefore, when the first body 12 and the second body 18 are first rotated away from the storage configuration described above, substantially all deformation of the seal 24 occurs in the seal second portion 28. This deformation continues until the second portion 139 of the hollow shaft 30 reaches the central opening 130 of the spacer 124, after which further upward force is applied against the spacer 124 and the small end 122 of the seal first portion 26 to compresses the seal first portion 26. The seal first portion 26 may be slightly deformed as the seal second portion 28 is compressed, but most of the deformation occurs in the seal second portion 28 until the second end portion 139 of the hollow shaft 30 reaches the central opening 130 in the spacer 124. Continued rotation of the second body 18 relative to the first body 12 pulls the spacer 124 and the small end 122 of the seal first portion 26 toward the bottom 14 of the first body 12 and causes the seal first portion 26 to bulge outwardly and press the outer wall of the seal first portion 26 tightly against the interior wall of the filler neck 148 to form a seal therewith that substantially prevents the passage of fluid between the outer wall of the seal first portion 26 and the inside of the large filler neck 148. Once sealed in the small filler neck 146 or the large filler neck 148, air can be removed from a radiator connected to one of the filler necks 146, 148, in a conventional manner with the seal formed between the seal 24 and the interior of the small filler neck 146 or the large filler neck 148 being sufficient to maintain a partial vacuum in the radiator.

Upward movement of the hollow shaft 30 relative to the first body 12 is limited by the second disk 144 which cannot move past the top 48 of the central chamber 46 of the first body 12. This prevents the second body 18 from being removed from the first body 12 and also limits the degree to which the seal first portion 26 can be compressed to reduce the likelihood of damaging the seal 24 by over compression.

However, movement between the first body 12 and the second body 18 in a direction along the longitudinal axis of the hollow shaft 30 is not otherwise limited, and the first and second bodies 12, 18 are not interlocked as they would be if they were connected with screwthreads. In other words, the first body 12 and the second body 18 could be pulled away from one another without relative rotation if sufficient force were applied.

The present invention has been described herein in terms of a presently preferred embodiment. Modifications and/or additions to this embodiment will become apparent to persons of ordinary skill in the art upon a reading of the foregoing description. It is intended that all such modifications and additions form a part of the present invention to the extent they fall within the scope of the several claims appended hereto.

What is claimed is:

1. An adapter comprising:
    a first body having a bottom;
    a second body having a top and being rotatably mounted to the first body, the first body and the second body being movable between a first angular relationship and a second angular relationship;
    a first ramp having a first ramp surface on a first one of the first body and the second body;
    a ramp follower on a second one of the first body and the second body in contact with the first ramp surface;
    the first body bottom being separated from the second body top by a first distance when the first body and second body are in the first angular relationship and by a second distance greater than the first distance when the first body and the second body are in the second angular relationship;
    the ramp follower moving from a first location on the first ramp surface to a second location on the first ramp surface in response to the first body and the second body moving from the first angular relationship to the second angular relationship;
    a compressible seal extending from the first body, the compressible seal having a first end at the first body, a second end spaced from the first body, an interior, and an outer wall configured to form a fluid-tight seal with an interior of an opening;
    a shaft projecting from the second body through a passage in the first body and into the interior of the compressible seal, the shaft being configured to move relative to the first body when the first body and the second body move from the first angular relationship to the second angular relationship and being configured to move the second end of the compressible seal toward the first body and radially expand the compressible seal against the interior of the opening when the first body and the second body move from the first angular relationship to the second angular relationship.

2. A device for at least partially blocking an opening comprising:
    a first body having a bottom;
    a second body having a top and being rotatably mounted to the first body, the first body and the second body being movable between a first angular relationship and a second angular relationship;
    a first ramp having a first ramp surface on a first one of the first body and the second body;
    a ramp follower on a second one of the first body and the second body in contact with the first ramp surface;
    the first body bottom being separated from the second body top by a first distance when the first body and second body are in the first angular relationship and by a second distance greater than the first distance when the first body and the second body are in the second angular relationship;
    the ramp follower moving from a first location on the first ramp surface to a second location on the first ramp surface in response to the first body and the second body moving from the first angular relationship to the second angular relationship;
    a compressible seal extending from the first body, the compressible seal having a first end at the first body and a second end spaced from the first body and having an interior;
    a shaft projecting from the second body through a passage in the first body and into the interior of the compressible seal, the shaft being configured to move relative to the first body when the first body and the second body move from the first angular relationship to the second angular relationship and being configured to move the second end of the compressible seal toward the first body and compress the compressible seal when the first body and the second body move from the first angular relationship to the second angular relationship.

3. The device of claim 2, wherein the device comprises an adapter and wherein the shaft has a though opening configured to allow a fluid to pass through the adapter.

4. The device of claim 2, wherein the first ramp surface includes first and second helical edges and an end edge, and wherein the ramp includes an end wall at the end edge of the first ramp surface.

5. The device of claim 2, wherein the ramp follower comprises a second ramp having a second ramp surface in contact with at least a portion of the first ramp surface.

6. The device of claim 5, wherein the first ramp and the second ramp are mounted in non-interlocking contact.

7. The device of claim 3, wherein the first ramp surface is helical and wherein the first ramp surface travels no more than about 360° around an axis of the helical first ramp surface.

8. The device of claim 3, wherein:
    the first body comprises a base including the first body bottom, the first ramp is located on the first body and projects from the base, and the first ramp is helical and surrounds a central passage through the first body, and
    the second body comprises a cap having an interior, wherein the ramp follower comprises a second helical ramp in the interior of the cap.

9. The device of claim 8, wherein the first ramp comprises an outer ramp sidewall extending from the base to the first ramp surface.

10. The device of claim 3, wherein the first ramp comprises a curved wall projecting from the base, the curved wall having a first end, a second end, and a first sidewall and a top surface forming the first ramp surface, a spacing between the base and the first ramp surface being greater at the second end of the curved wall than at the first end of the curved wall.

11. The device of claim 10 wherein the spacing increases monotonically from the first end of the curved wall to the second end of the curved wall.

12. The device of claim 3, wherein the compressible seal comprises a first portion including the first end of the compressible seal and a second portion including the second end of the compressible seal, the first portion being separated from the second portion by a spacer formed of a material different than a material of the first portion and different than a material of the second portion.

13. The device of claim 12, wherein the first portion comprises a truncated cone having a large end at the first end of the compressible seal and a small end, wherein the spacer is located at the small end of the truncated cone, wherein the second portion comprises a cylinder on the spacer and wherein the shaft is configured to bias the second potion toward the first portion.

14. A device for at least partially blocking an opening comprising:
   a first body having a bottom, a top and a curved wall projecting from the top, the curved wall having a first end and a second end, and at least one curved sidewall, the curved wall following a periphery of the first body and having a wall top surface spaced from the first body top by a first distance, the first distance increasing from the first end of the curved wall to the second end of the curved wall;
   a second body having an open bottom, a top and an interior configured to receive the curved wall of the first body, the interior including a curved ramp having a first end and a second end and a bottom surface, the bottom surface being spaced from the second body top by a second distance, the second distance increasing from the first end of the second ramp to the second end of the second ramp, the second body being mounted on the first body with the bottom surface of the curved ramp resting on the top surface of the curved wall;
   a compressible seal extending from the first body bottom, the compressible seal having a first end at the first body and a second end spaced from the first body and an interior; and
   a shaft projecting from the second body through a passage in the first body and into the interior of the compressible seal.

15. The device of claim 14, including an end wall extending from the second end of the curved wall to the body top and a through opening in the shaft.

16. The device of claim 14, wherein the shaft projects beyond the second end of the compressible seal and includes a flange overlying an end of the compressible seal.

17. The device of claim 16, wherein the compressible seal comprises a first portion comprising a truncated cone having a large end at the first body and a small end and a second portion comprising a cylinder at the small end and spaced from the small end by a spacer.

18. The device of claim 17, wherein the spacer has an opening, wherein the shaft extends through the opening in the spacer and wherein a diameter of the shaft between the spacer and the second end of the compressible seal is greater than a diameter of the opening in the spacer.

19. A device for at least partially blocking an opening comprising:
   a first body having a bottom;
   a second body having a top and being mounted to the first body, the first body and the second body being mutually rotatable between a first angular relationship and a second angular relationship;
   the first body bottom being separated from the second body top by a first distance when the first body and second body are in the first angular relationship and by a second distance greater than the first distance when the first body and the second body are in the second angular relationship;
   a compressible seal extending from the first body, the compressible seal having a first end at the first body and a second end spaced from the first body and an interior;
   a shaft projecting from the second body through a passage in the first body and into the interior, the shaft being configured to move relative to the first body when the first body and the second body move from the first angular relationship to the second angular relationship and being configured to move the second end of the compressible seal toward the first body and compress the compressible seal when the first body and the second body move from the first angular relationship to the second angular relationship; and
   means for moving the second body top away from the first body bottom in response to the rotation of the first body and the second body from the first angular relationship to the second angular relationship.

20. The device of claim 19, wherein the means for moving comprises a first ramp on a first one of the first body and the second body, the ramp having a ramp surface, and a ramp follower on a second one of the first body and the second body in contact with the first ramp.

* * * * *